Jan. 28, 1969  R. K. KOELLING  3,423,958
FLEXIBLE COUPLING ASSEMBLY AND COUPLINGS THEREFOR
Filed Jan. 9, 1967

INVENTOR
Robert K. Koelling
BY
ATTORNEYS

Jan. 28, 1969 R. K. KOELLING 3,423,958
FLEXIBLE COUPLING ASSEMBLY AND COUPLINGS THEREFOR
Filed Jan. 9, 1967 Sheet 2 of 3

INVENTOR
Robert K. Koelling

BY
ATTORNEYS

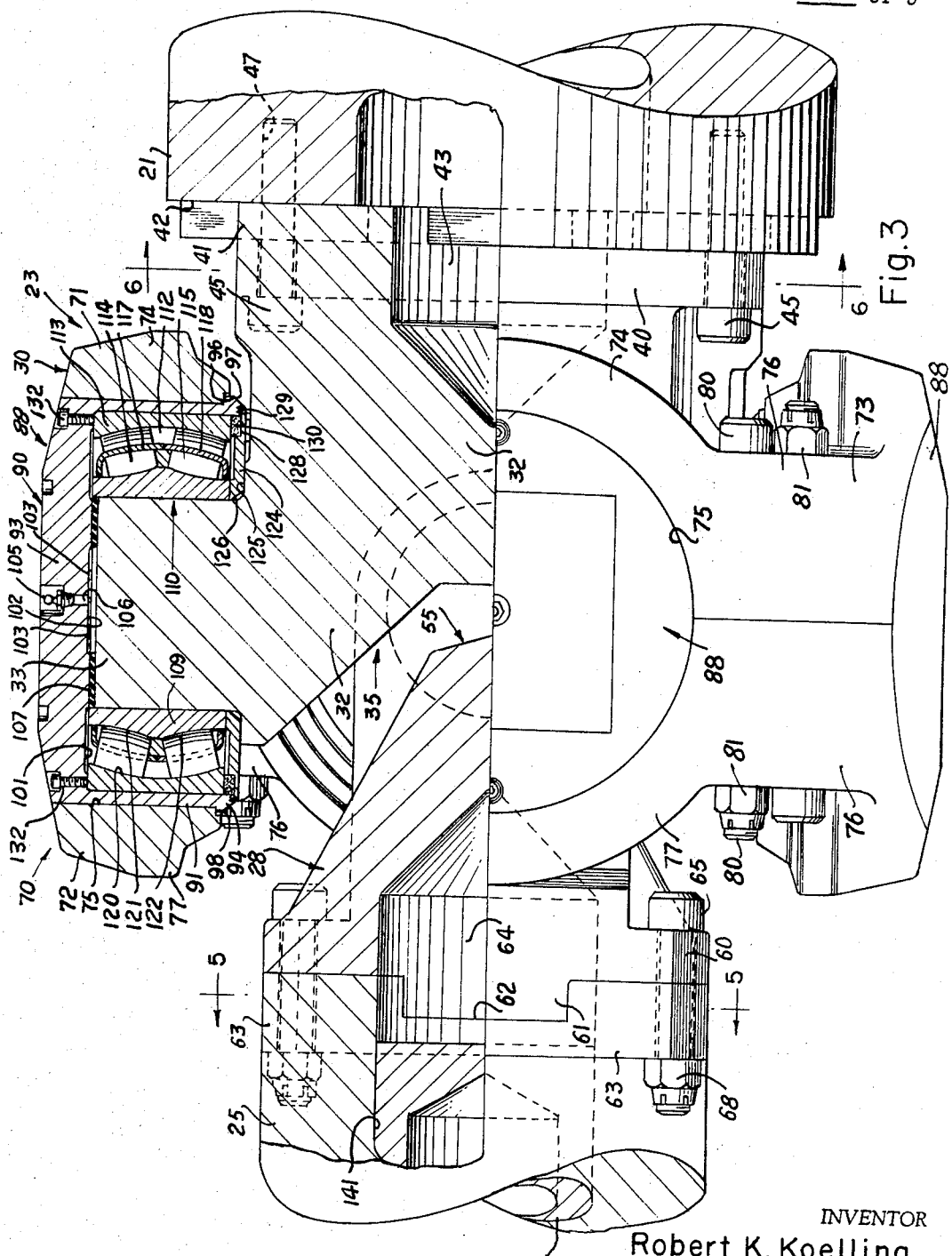

United States Patent Office 3,423,958
Patented Jan. 28, 1969

3,423,958
FLEXIBLE COUPLING ASSEMBLY AND
COUPLINGS THEREFOR
Robert K. Koelling, 9430 Shoreview, Dallas, Tex. 75238
Filed Jan. 9, 1967, Ser. No. 607,943
U.S. Cl. 64—18                                    7 Claims
Int. Cl. F16d 3/42; F16c 33/58

ABSTRACT OF THE DISCLOSURE

A flexible coupling assembly for connecting a driving shaft to a driven shaft which is subject to displacement relative to the driving shaft, the coupling assembly including a pair of couplings connected by a connector shaft of variable length. A coupling including a pair of yokes connected to a torque transmitting ring for pivotal movement about mutually perpendicular intersecting axes, the yokes having base portions disposed outwardly of the sides of the ring and provided with keys receivable in slots of shafts to which they are connectable for transmitting torque between the shafts and the yokes.

---

This invention relates to a flexible coupling assembly and to couplings usable in such assembly.

An object of this invention is to provide a new and improved flexible coupling assembly which permits great torque forces to be transmitted from a driving shaft to a driven shaft wherein the driven shaft is movable to a limited degree relative to the driving shaft.

Another object is to provide a coupling assembly having a variable length connector shaft and a pair of couplings, wherein each of the couplings has a pair of yokes connected by a torque transmitting connector ring for pivotal movement relative to each other about mutually perpendicular axes.

Still another object is to provide a flexible coupling assembly which is relatively light in weight and capable of transmitting great torque forces from a driving shaft to a driven shaft.

A further object is to provide a new and improved coupling having a pair of yokes connected to a torque transmitting ring for pivotal movement relative to each other about mutually perpendicular axis, the yokes having base portions disposed outwardly of opposite sides of the ring and having keys integral therewith for transmitting torque to shafts to which the base portions are connectable.

A further object is to provide a coupling having a new and improved means for the trunnions of the yokes which are rotatable in bearing apertures of the ring.

A still further object is to provide a coupling wherein the bearing means permit limited displacement of the yokes relative to the ring.

Another object is to provide a coupling which is easily assembled, the ring being formed of two annular sections rigidly connected to one another to hold the bearing means and the yokes in desired structural and functional relationship to one another.

Still another object is to provide a coupling wherein the ring sections at locations subject to greatest stresses are of maximum dimensions and strength and wherein the bearing apertures are of relatively great diameter to permit use of large bearings whereby the load capacity of the coupling is great.

Additional objects and advantages of the invention will be readily apparent from the reading of the following description of a device constructed in accordance with the invention, and reference to the accompanying drawings thereof, wherein:

FIGURE 3 is an enlarged partly sectional view of a coupling embodying the invention;

Figure 1:
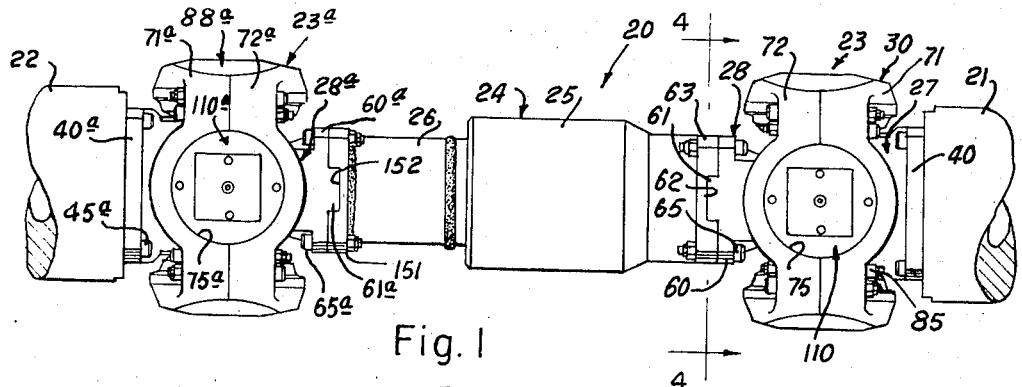
FIGURE 1 is a side view of a coupling assembly embodying the invention shown connecting a driving shaft to a driven shaft.
Figure 4:
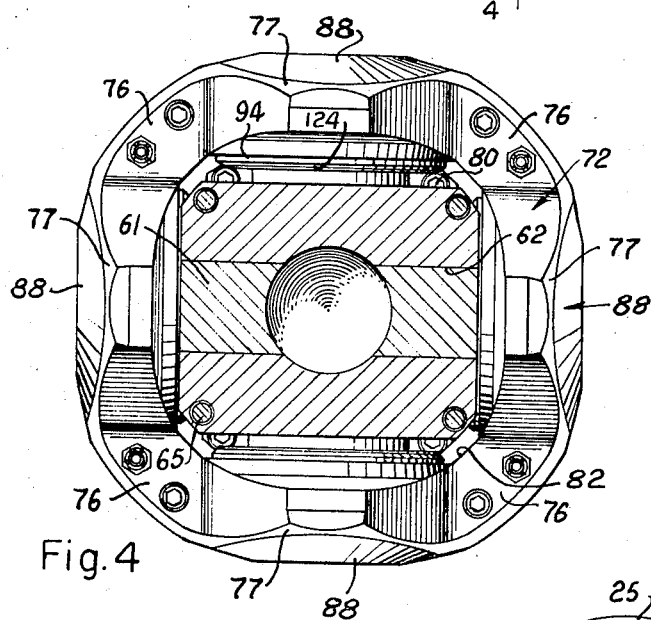
FIGURE 4 is an enlarged sectional view taken on line 4—4 of FIGURE 1.
Figure 6:
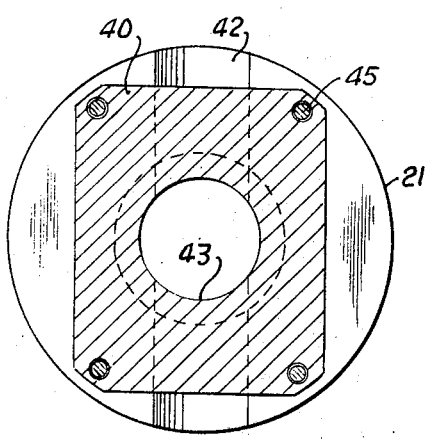
FIGURE 6 is a sectional view taken on line 6—6 of FIGURE 3.
Figure 5:
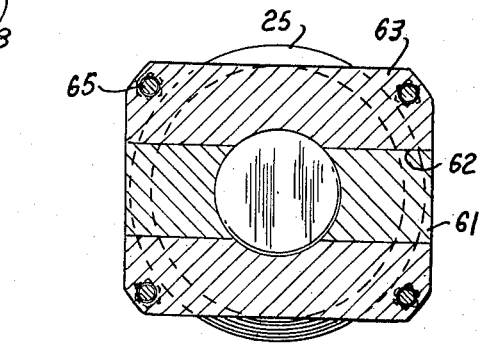
FIGURE 5 is a sectional view taken on line 5—5 of FIGURE 3.
Figure 2:
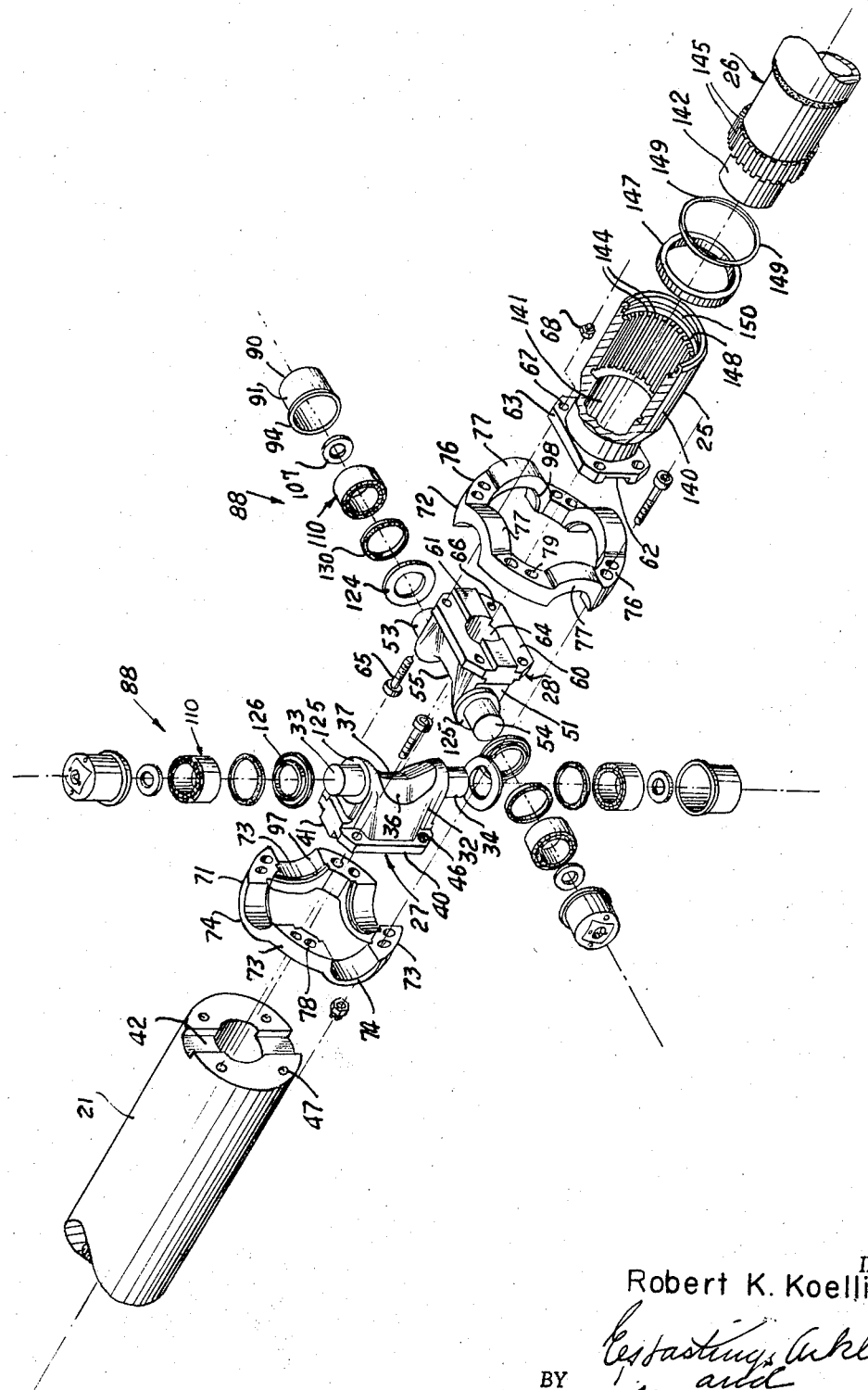
FIGURE 2 is an exploded perspective view of a coupling embodying the invention.

Referring now to the drawings, the coupling assembly 20 embodying the invention may be used to connect a driven shaft 21 to a driving shaft 22. For example, the driving shaft 22 may be the output shaft of a speed reducing transmission and the driven shaft may be the horizontal shaft of a forming toll of a rolling mill wherein the forming roll, and, therefore, the shaft 22, is mounted for limited vertical movement and moves vertically during the operation of the rolling mill.

The coupling assembly includes a pair of flexible couplings 23 and 23a and a connector shaft 24 connecting the two flexible couplings. The connector shaft includes two sections 25 and 26 capable of limited longitudinal telescoping movement relative to one another so that the length of the connector shaft may vary as required as the driven shaft moves vertically relative to the driving shaft.

The coupling 23 includes a pair of yokes 27 and 28 and a torque transmitting connector ring assembly 30 which connects the two yokes and permits limited pivotal movement of the two yokes relative to each other about mutually perpendicular intersecting axes. The yoke 27 includes a body 32 having a pair of longitudinally spaced trunnions 33 and 34 integral with the body and extending in opposite directions at opposite ends of a longitudinal recess 35 in the inner portion of the body. The recess is defined by outwardly divergent surfaces 36 and 37.

The body also has an outer substantially planar base portion 40 provided with a central longitudinal tongue or key 41 which is receivable in the slot 42 of the driven shaft 21. The base portion is of elongate rectangular configuration with the key extending parallel to the long dimension of the base and to the axis of the trunnions. The yoke may be provided at its base with an outwardly opening blind bore 43 to minimize the weight of the coupling. The yoke is secured to the end of the driven shaft by a plurality of bolts 45 which extend through the apertures 46 of the base portion into threaded bores 47 in the end of the driven shaft. The shanks of the bolts are smaller in diameter than the apertures 46 so that the bolts are in tension and are not under any shear stresses, the torque being transmitted from the yoke 27 to the driven shaft 21 by the engagement of the key with the surfaces of the driven shaft defining its slot 42. The outer planar surface of the base portion 40 on opposite sides of the key abuts the planar end surface of the driven shaft on opposite sides of the slot.

The yoke 28 is identical in structure to the yoke 27 having a pair of trunnions 53 and 54 and an inner recess 55. The base portion 60 of the body of the yoke 28 also has a tongue or key 61 which is receivable in the slot 62 of the planar base portion 63 of the female connector shaft section 25. The yoke 28 also has a bore 64 which opens to the outer side of its planar base portion. The yoke 28 is secured to the connector shaft section 25 by a plurality of bolts 65 which extends through aligned apertures 66 and 67 in the base portions 60 and 63, respectively. The bolts have self-locking nuts 68 on their threaded ends. The shanks of the bolts 65 are also smaller in diameter than the apertures 66 and 67 so that these bolts also are only in tension when connecting the yoke to the shaft section 25, the torque being transmitted from the shaft section to the yoke 28 by the engagement of the key with the surfaces of the base portion 63 of the shaft section defining its slot 62.

The ring assembly includes a connector ring 70 having a pair of identical sections 71 and 72. The ring section 71 has four connector portions 73 and four bearing portions 74. The internal surface of each bearing portion defines one-half a bearing aperture 75 of the ring, the ring having two pairs of such bearing apertures. The other ring section 72 similarly has four connector sections 76 and four arcuate sections 77 which define the other halves of the bearing apertures. The connector portions 73 and 76 of the ring sections have apertures 78 and 79, respectively, through which bolts 80 extend to connect the two ring sections. The bolts are placed under predetermined tension by means of self-locking nuts 81 to rigidly secure the two sections of the ring to one another.

The ring 70 has a central aperture 82, the dimensions of the aperture between opposed pairs of the arcuate bearing portions of the ring sections being slightly greater than the long dimensions of the rectangular base portions of the yokes so that the ring sections may be moved over the base portions to receive the trunnions of the yokes in their arcuate bearing portions.

The trunnions of the yokes are rotatably supported in bearing devices 88 disposed in the bearing apertures of the ring. Each bearing device includes a housing 90 having a cylindrical wall 91 of the same external diameter as the diameter of the bearing apertures 75 and an outer circular end portion 93. An external annular flange 94 of the cylindrical wall provides an annular outwardly facing stop shoulder 96.

The stop shoulder 96 of each bearing housing engages the inwardly facing semicircular shoulders 97 and 98 of ring sections 71 and 72, respectively, which extend about the bearing aperture in which such bearing housing is disposed to secure the bearing housing in the bearing aperture against the outward movement therefrom. The outer end portion of each bearing housing is provided with an internal annular groove 101 and a central circular recess 102 which communicate with one another through radial grooves 103 so that lubricant injected into the bearing housing through a suitable injection fitting 105 threaded in the passage 106 of the bearing housing may flow radially outwardly past a thrust washer 107 which is disposed between the top end of the trunnion and the bearing housing inwardly of the inner race 109 of a bearing assembly 110, and into the annular passage or space 112 between the inner race 109 and the outer race 113. The bearing assembly includes upper and lower sets of identical spherical rollers 114 and 115, respectively, held in spaced relation by suitable retainer rings 117 and 118, respectively, the rollers being disposed in suitable slots of the retainer rings. The bearing assembly may be of the spherical roller type commercially available as Model No. SKF 23240C–C1 from SKF Industries, Inc. The rollers have longitudinally arcuate or spherical surfaces of the same radius of curvature as the internal surface 120 of the outer race. The inner race has top and bottom surfaces 121 and 122 of the same radii of curvature as the external surfaces of the rollers and engaged thereby. The arcuate surfaces of the rollers and of the races which they engage permit a limited degree of tilting movement of the trunnion relative to the ring since the thrust washer is of a somewhat resilient substance, such as nylon or the like. This limited degree of adjustment between the trunnion and the ring minimizes wear of the bearing assembly which tends to take place if the axes of the driven and driving shafts are not exactly parallel or if suddenly imposed overloads cause momentary trunnion deflections.

The lower end of the annular passage between the races is closed by a bottom closure ring 124 whose downward movement on the trunnion is limited by the upwardly facing annular shoulder 125 of each yoke, the bottom surface of the inner race abutting the top surface of an annular flange 126 of the closure ring. The outer reduced portion 128 of the closure ring extends outwardly below the bottom end of the bearing housing which is provided with a plurality of annular grooves 129. A porous seal ring 130 of felt or the like is interposed between the bottom surface of the outer race and the top surface of the reduced outer portion of the closure ring. The felt and the grooves permit forced flow of fluids from the bearing housing during the introduction of oil or grease under pressure into the bearing housing through the fitting 105. The grooves, in effect, provide a labyrinth seal which under normal conditions prevents flow of lubricant from the bearing housing.

Bolts 132 close the apertures 133 of the bearing housing in which studs may be threaded to engage the top edge surface of the outer race to force the bearing assembly out of the bearing housing when it is desired or necessary to remove the bearing assembly from the housing, as for replacement.

The coupling 23 is assembled by placing the bearing devices 88 on the trunnions of the yokes and the two sections of the ring are then moved over the base portions of the yokes toward the trunnions. The two ring sections are then rigidly secured to one another by means of the bolts 80 and nuts 81. The engagement of the shoulders 97 and 98 of the ring sections with the stop shoulders 96 of the bearing housing then secures the bearing devices against displacement from the ring. The ring assembly holds the two yokes in position wherein the axes of their trunnions lie in the central plane of the ring and extend perpendicularly to and intersect one another so that the two yokes are pivotally movable relative to the ring about mutually perpendicular axes.

It will be apparent that the inner longitudinal middle portion of each poke body extends into the inner longitudinal recess of the body of the other yoke and that the divergent surfaces defining such recesses permit a limited degree of pivotal movement of each yoke about the axis of its trunnions, the degree of such pivotal movement being sufficiently great to accommodate the normal degree of displacement of the driven shaft relative to the driving shaft. The axis of the trunnions of each yoke is coincident with the central axis of the bearing apertures of the ring in which the trunnions are disposed.

The connector portions of the two ring sections are of relatively great thickness since the ring sections are subjected to greatest stresses at locations angularly displaced approximately 45 degrees from the axes of the trunnions of the two yokes. The arcuate bearing sections of the two ring sections are not subjected to great stresses of as great magnitude and are of lesser thickness and permit the bearing apertures to be relatively large in order that large bearing devices may be interposed between the trunnions and the ring in order that the bearings may carry the great loads imposed thereon.

The female connector shaft section 25 has a tubular portion 140 extending from its planar base portion 63 in whose inner reduced portion 141 is slidably received the reduced end portion 142 of the male connector shaft section 26. The section 25 is provided with a plurality of longitudinal circumferentially spaced splines 144 which mesh with the external splines 145 of the shaft section 26. A seal ring 147 for retaining lubricant within the female connector shaft section is held between the stop shoulders 148 of the splines 144 and the inner portions of a split retainer or latch ring 149 whose outer portions are receivable in an internal annular recess 150 of the male connector section.

The outer end of the male shaft section 26 is provided with a planar base portion 151 having a slot 152 in which is receivable the tongue or key 61a of the yoke 28a of the coupling 23a. The coupling 23a being identical with the coupling 23, its elements have been provided with the same reference numerals, to which the subscript "a" has been added, as the corresponding elements of the coupling 23. The yoke 27a is secured to the driving shaft by means of bolts 45a which extend through the suitable apertures in its base portion 40a into threaded bores provided in the end of the driving shaft 22.

It will be apparent that the yokes 28 and 28a which are connected to the opposite ends of the connector shaft 24 may be regarded as inner yokes of the couplings 23 and 23a that the couplings 27 and 27a which are connected to the driven and driving shafts, respectively, may be regarded as the outer yokes thereof.

If the driving or driven shafts have flanges similar to those of the connector shaft, the outer yokes are connected to such flanges by means of bolts or lock nuts.

Torque is transmitted between each yoke and the shaft to which it is connected only by its integral key so that for dimensions and weight of the coupling, great forces may be transmitted between the shaft and the yoke. Torque is transmitted from the one connector shaft section to the other by means of the meshing splines thereof.

If the driven shaft 21 moves vertically to a position wherein its axis is not in exact alignment with the axis of the drive shaft, the yokes of the two couplings will pivot relative to one another as required to accommodate this movement and the shaft 24 will elongate to the degree necessary, the two sections of the connector shaft moving outwardly in opposite directions relative to one another while the driving connections therebetween is maintained by their meshing splines, it being obvious that the length of the splines 144 is sufficiently great to accommodate a desired degree of variation in the length of the connector shaft 24.

It will be apparent that very great forces may be transmitted from each yoke to a shaft to which the yoke is connected since the keys are integral with the yokes and thus of great strength and since the torque is transmitted through the engagement of the key surfaces with the surfaces defining slots in the shafts.

It will also be apparent that due to the provision of bearing assemblies which permit a certain degree of displacement of the axis of the trunnions relative to the central axis of the bearing apertures of the ring in which they are disposed, the bearings will not be subjected to undue wear in the event that axes of the driven and driving shafts are not exactly parallel, as many occur due to wear of the bearings in which such shafts are rotatably mounted and the like, or in the event sudden overloads cause momentary deflections of the trunnions.

It will further be seen that a new and improved coupling 23 has been illustrated and described which permits a relatively great degree of pivotal movement of its yokes and that the coupling has bearing devices between the trunnions of its yokes and the connector ring in whose bearing apertures the trunnions are disposed provided with means for effecting thorough and proper lubrication of the bearing devices.

It will also be seen that the connector ring has relatively large bearing apertures so that large bearings may be used to rotatably support the trunnions of the yokes but that the bearing portions of the ring do not unduly restrict the degree of piovtal moment of the yokes.

It will further be seen that the connector portions of the ring sections which are subjected to greatest stresses during the operation of the couplings are of relatively great thickness to withstand such great stresses.

It will further be seen that the couplings are easily and quickly assembled and that they are provided with new and improved bearing devices easily secured to and between the trunnions and the ring.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A flexible coupling assembly for connecting a driven shaft to a driving shaft, the driving and driven shafts having facing ends provided with slots extending transversely to the axis of rotation of said shafts, said coupling assembly including: a pair of couplings, each of said couplings having a ring having two pairs diametrically aligned bearing apertures; a pair of yokes, each of said yokes having a pair of spaced trunnions disposed in a pair of said bearing apertures, said yokes being pivotally movable relative to each other about mutually perpendicular intersecting axes lying in the central plane of said ring; bearing means in said bearing apertures of said ring disposed between said trunnions and said rings, said bearing means permitting limited displacement of the axis of the trunnions of the yoke from the central axis of the bearing apertures of said ring in which the trunnions are disposed, each of said bearing means including a bearing housing having a cylindrical portion extending through a bearing aperture of the ring, and a bearing assembly in said bearing housing and the trunnion, each of said bearing assemblies including an inner race on the trunnion, an outer race engaging said cylindrical portion and rollers between said races, said rollers and said races having spherical contacting surfaces of the same radii to permit limited displacement of said trunnion relative to said ring, said yokes having base portions disposed outwardly and on opposite sides of said ring, each of said base portion having a key extending outwardly thereof and parallel to the axis of pivotal movement of the yoke; a connector shaft extending between said pair of couplings and having oppositely facing slots in which said keys of said base portions of adjacent inner yokes of the couplings are disposed; and means connecting said base portions to opposite end portions of said connector shaft, the base portions of outer yokes of said couplings being connectable to said driving and driven shafts, the keys being receivable in the slots of the driving and driven shafts.

2. A flexible coupling assembly for connecting a driven shaft to a driving shaft, the driving and driven shafts having facing ends provided with slots extending transversely to the axes of rotation of said shafts, said coupling assembly including: a pair of couplings, each having a ring having two pairs of diametrically aligned bearing apertures, a pair of yokes, each of said yokes having a pair of spaced trunnions disposed in a pair of said bearing apertures, said yokes being pivotally movable relative to each other about mutually perpendicular intersecting axes lying in the central plane of said ring, said yokes having base portions disposed outwardly and on opposite sides of said ring, each of said base portions having a key extending outwardly thereof and parallel to the axis of pivotal movement of the yoke; a connector shaft extending between said pair of couplings and having oppositely facing slots in which said keys of said base portions of adjacent inner yokes of the couplings are disposed; means connecting said base portions to opposite end portions of said connector shaft, the base portions of outer yokes of said couplings being connectable to said driving and driven shafts, their keys being receivable in the slots of the driving and driven shafts, said yokes each having a body having a longitudinal recess between its trunnions, said trunnions and said key being integral with said body whereby all torque forces transmitted between a shaft and a yoke connected thereto are by means of said key; and bearing means in said bearing means in said bearing apertures of said ring disposed between said trunnions and said ring, said bearing means permitting limited displacement of the axis of the trunnions of the yoke from the central axis of the bearing apertures of said ring in which the trunnions are disposed, each of said bearing means including a bearing housing having a cylindrical portion extending through a bearing aperture of a ring and having an external annular flange engageable with a stop means of the ring for limiting outward movement of said housing in the bearing aperture, and an annular closure disposed about a trunnion and overlapping said cylindrical portion, and a bearing assembly in said bearing housing between said cylindrical portion and the trunnion, said bearing housing of each of said bearing means being provided with inlet means at its outer end for introducing lubricant into said housing, said cylindrical portion and said closure having means normally preventing flow of lubricant from said housing and permitting flow of lubricant therefrom when the lubricant is subjected to a pressure exceeding a predetermined value, each of said bearing assemblies including an inner race on the trunnion, an outer race engaging said cylindrical portion and rollers between said races, said rollers and said races having spherical surfaces of the same radii to permit limited displacement of said trunnion relative to said ring.

3. A flexible coupling including: a ring having two pairs of diametrically aligned bearing apertures, the central axis of one pair of said apertures extending perpendicular to and intersecting the central axis of the other pair; a pair of yokes, each of said yokes having a pair of longitudinally spaced trunnions disposed in a pair of said bearings apertures, said yokes being pivotally movable relative to each other about mutually perpendicular axes; and bearing means inside said bearing apertures of said rings between said trunnions and said rings, said bearing means permitting limited displacement of the axis of the trunnions of each yoke from the central axis of the bearing apertures in which said trunnions are disposed, each of said bearing means including a bearing housing having a cylindrical portion extending through a bearing aperture of the ring and a bearing assembly in said housing between said cylindrical portion and the trunnion, said bearing assembly including an inner race on the trunnion, an outer race engaging said cylindrical portion, and rollers between said races, said rollers and said races of each bearing means having spherical contacting surfaces of the same radii of curvature to permit limited displacement of said trunnion relative to said ring, said yokes having base portions disposed outwardly of and on opposite sides of said ring, each of said base portions having a key extending outwardly thereof and parallel to the axis of the trunnions of its yoke, the keys of said yoke being receivable in slots of shafts for transmitting torque forces therebetween, said yokes each having a body having a longitudinal recess between its trunnions, said trunnions and said key being integral with said body.

4. The flexible coupling of claim 3, wherein said ring includes two sections each having four arcuate bearing portions and four connector portions, said bearing portions providing said bearing apertures, said connector portions of said sections being rigidly secured to one another.

5. A flexible coupling including: a ring having two pairs of diametrically aligned bearing apertures, the central axis of one pair of said apertures extending perpendicular to and intersecting the central axis of the other pair; a pair of yokes, each of said yokes having a pair of longitudinally spaced trunnions disposed in a pair of said bearing apertures, said yokes being pivotally movable relative to each other about mutually perpendicular intersecting axes, said yokes having base portions disposed outwardly of and on opposite sides of said ring, each of said base portions having a key extending outwardly thereof and parallel to the axis of the trunnions of its yoke, the keys of said yokes being receivable in slots of shafts for transmitting torque forces therebetween, said yokes each having a body having a longitudinal recess between its trunnions, said trunnions and said key being integral with said body; and bearing means in said bearing apertures of said ring between said trunnions and said ring, said bearing means permitting limited displacement of the axis of the trunnions of each yoke from the central axis of the bearing apertures in which said trunnions are disposed, each of said bearing means including a bearing housing having a cylindrical portion extending through a bearing aperture of the ring and having an external annular flange engageable with an internal stop means of the ring for limiting outward movement of said housing in the bearing aperture, and an annular closure disposed about the trunnion extending outwardly and overlapping said cylindrical portion, and a bearing assembly in said housing outwardly of said closure and between said cylindrical portion and the trunnion, said bearing assembly including an inner race on the trunnion, an outer race engaging said cylindrical portion, and rollers between said races, said rollers and said races of each bearing means have spherical contacting surfaces of the same radii of curvature to permit limited displacement of said trunnion relative to said ring, said housing being provided with inlet means at its outer end for introducing lubricant into said housing, said cylindrical portion and said closure having means normally preventing flow of lubricant from said housing and permitting flow of lubricant therefrom when the lubricant is subjected to pressure exceeding a predetermined value.

6. The flexible coupling of claim 5, wherein each of said bearing means includes a resilient thrust washer between said housing and the outer end of said trunnion, said housing having an internal groove extending past said thrust washer for conducting lubricant from said inlet means to said bearing assembly.

7. The coupling of claim 6, wherein said ring includes two sections each having four arcuate bearing portions and four connector portions, said bearing portions providing said bearing apertures, said connector portions of said sections being rigidly secured to one another.

References Cited

UNITED STATES PATENTS

| | | | |
|---|---|---|---|
| 1,651,850 | 12/1927 | Swenson | 64—18 |
| 1,837,043 | 12/1931 | Heiden | 64—18 |
| 1,996,996 | 4/1935 | Harrison et al. | 64—18 |
| 2,597,240 | 5/1952 | Greiner | 64—17 |
| 2,698,527 | 1/1955 | Anderson | 64—17 |
| 3,070,980 | 1/1963 | Slaght | 64—17 |
| 3,178,907 | 4/1965 | Lyons | 64—17 |

FOREIGN PATENTS 4,902   8/1932   Australia.

HALL C. COE, *Primary Examiner.*

U.S. Cl. X.R.

308—216